US006809329B1

(12) United States Patent
Evans et al.

(10) Patent No.: US 6,809,329 B1
(45) Date of Patent: Oct. 26, 2004

(54) CONTAINER FOR WASTE

(75) Inventors: Raymond Victor Evans, Blackburn (GB); Andrew Ronald Whitley, Warrington (GB); John Emmison, Warrington (GB)

(73) Assignee: British Nuclear Fuels PLC, Cheshire (GB)

( * ) Notice: Subject to any disclaimer, the term of this patent is extended or adjusted under 35 U.S.C. 154(b) by 0 days.

(21) Appl. No.: 09/958,793

(22) PCT Filed: Apr. 7, 2000

(86) PCT No.: PCT/GB00/01321

§ 371 (c)(1),
(2), (4) Date: Jun. 19, 2002

(87) PCT Pub. No.: WO00/63920

PCT Pub. Date: Oct. 26, 2000

(30) Foreign Application Priority Data

Apr. 16, 1999 (GB) ............................................ 9908610

(51) Int. Cl.[7] ................................................ B09B 3/00

(52) U.S. Cl. .................... 250/506.1; 588/252; 588/249; 405/128; 220/411; 220/453

(58) Field of Search ....................... 250/506.1; 588/252, 588/249; 405/128; 220/411, 453

(56) References Cited

U.S. PATENT DOCUMENTS

| | | | |
|---|---|---|---|
| 5,416,249 | A | 5/1995 | Crayne et al. |
| 5,829,362 | A | 11/1998 | Evans et al. |

FOREIGN PATENT DOCUMENTS

| | | |
|---|---|---|
| EP | 0 303 264 | 2/1989 |
| FR | 2 249 547 | 5/1975 |
| JP | 01118800 | 11/1989 |
| JP | 11337684 | 10/1999 |
| WO | WO84/00343 | 2/1984 |
| WO | WO95/33268 | 12/1995 |
| WO | WO95/33269 | 12/1995 |

*Primary Examiner*—John R. Lee
*Assistant Examiner*—Zia R. Hashmi
(74) *Attorney, Agent, or Firm*—Howard & Howard

(57) ABSTRACT

A sealable container for receiving toxic waste for long-term storage is described, the container comprising sheet metal members welded together to form a main fillable volume; four hollow, sheet metal, vertically directed leg portions situated at corner positions on the container, and, a separate lid member fixable to the container to seal at least the main fillable volume wherein the majority of the weld length utilized in the container construction is constituted by fillet welds. Further constructions are described having means to prevent flotation of waste in a liquid grout prior to solidification thereof and constructions where the leg volumes are independently fillable of the main volume.

17 Claims, 12 Drawing Sheets

CONTAINER FOR WASTE

The present invention relates to a sealable container particularly, though not exclusively, for the containment and storage of radioactive waste.

So-called intermediate level radioactive waste is generally stored in sealed containers which are initially stored for a period of time, about 100 years for example, in storage vaults. It is intended for these filled and sealed containers to be eventually stored in underground repositories, the repositories themselves being back-filled with a liquid grout to seal the filled containers therein. Alternatively, the repositories may not be back-filled for a further period of about 50 years allowing recovery of the containers if desired.

Present containers are generally rectangular box-shaped and made from stainless steel sheet material having vertical stiffening leg portions situated in a mid-wall position. The corners of the basic box are rounded off to avoid criticality situations arising when four boxes are stacked in a square, corner to corner orientation. However, whilst this is a safe configuration, the presence of the vertical stiffening legs at mid-wall positions reduces the available waste accommodating volume of the container. A further disadvantage of present container designs is that they are constructed by full-thickness penetration welds which are expensive due to the labour intensive preparation needed.

Another form of containment for the storage of intermediate level radioactive waste is by the use of stainless steel drums filled with waste, grouted and sealed and holding four drums for example together in a so-called stillage. Such a stillage for holding waste filled drums is described in WO95/33268 of common ownership herewith. The stillage comprises an open, fabricated sheet metal construction for holding up to four drums, the stillage having four legs at corner positions. The legs are strong in the vertical direction and have features enabling a plurality of filled stillages to be stacked one above the other in stacks of up to nine stillages high for example in a store or repository with no additional interconnection between the stillages. The number of stillages in the stack depends upon the strength of the stillages and, in principle, there could be more than nine in a stack. Such a storage system is described in WO95/33269 also of common ownership herewith. The particular form of construction shown in the above noted prior art references renders the stacked stillages particularly resistant to toppling during a seismic event for example, i.e. the stacked stillages are more inherently stable than known systems of stacked containers.

It is an object of the present invention to provide a sealable container for receiving intermediate level. radioactive waste which container is less expensive to manufacture than known sealable containers.

It is a further object of the present invention to provide a sealable container which is compatible with regard to stacking with the stillages described in WO95/33268 and WO95/33269 without restriction, i.e. there may be any mix of stillages and/or containers adjacent one another and/or in a stack.

According to a first aspect of the present invention, there is provided a sealable container for receiving toxic waste for long-term storage, the container comprising sheet metal members welded together to form a main fillable volume; four hollow, sheet metal, vertically directed leg portions situated at corner positions on the container; and, a separate lid member fixable to the container to seal at least the main fillable volume wherein the majority of the weld length utilised in the container construction is constituted by fillet welds.

Fillet welds are welds formed by the joining together of sheet metal wherein the joint comprises one sheet overlying a second sheet in a parallel or orthogonal relationship for example and a fillet of weld metal is formed between the edge of the first sheet and the surface of the second sheet. In this regard reference is made to British Standards BS 499: Part 1: 1983, the content of which is incorporated herein by reference. Conventional welds for the construction of such containers have employed full-depth penetration welds where two sheet edges abutting each other are ground away to form an included angle of about 90° which is then filled with weld metal. Such welds are very expensive to produce owing to the extensive pre-welding joint preparation needed. It has been found that the integrity of containers constructed according to the present invention is adequate for the purpose intended and that the life of such containers is also comparable to prior art containers.

It is intended that the length of fillet welds in the construction of containers according to the present invention should be greater than 50% of the total weld length.

According to a second aspect of the present invention, there is provided a sealable container for receiving toxic waste for long-term storage, the container comprising sheet metal members welded together to form a main fillable volume; four hollow, sheet metal, vertically directed leg members having cavities therein and situated at corner positions on the container; and, a separate lid member fixable to the container to seal at least the main fillable volume wherein the cavities of the four hollow leg members are sealed from the main volume of the container but are fillable from the exterior of the container.

Containers according to the second aspect of the present invention have hollow leg members situated at the container corners. When four containers are stacked adjacent each other in a square array, there is no danger of a criticality situation arising due to too much radioactive material being in close proximity at the corner region since the volume of the leg members is sealed from the main container volume. However, a requirement of containers for long term storage of radioactive waste is that all volumes must be fillable by grout, poured for example into a repository containing a plurality of such containers. Thus, the leg volumes of containers according to the second aspect of the present invention are provided with suitable apertures in appropriate places such that a rising level of liquid grout in a repository, for example, will fill the leg volumes of the containers even when a plurality of such containers are stacked one upon the other and/or stacked with stillages as hereinabove described with reference to the prior art.

Alternatively, the leg volumes may be filled with grout prior to being placed in a long-term storage facility in order to ensure that the leg volumes are entirely filled. In a container where the leg volumes are to be filled prior to storage, the legs will be sealed apart from a suitable aperture at the top thereof for filling purposes.

The construction of the leg portions may take many varied forms. The leg portions may take the form of separate leg member fabrications which are attached to the main fillable volume or may utilise part of a vertical wall member of the main fillable volume to form part of the leg construction.

The fact that the leg members are situated at the container corners is important since the hollow leg members are intended to readily deform if the container is dropped onto a hard surface so as to absorb impact forces. However, the welds at the legs and around the edges of the main fillable volume of the container must remain intact which testing has confirmed to be the case.

According to a third aspect of the present invention, there is provided a sealable container for receiving toxic waste for long-term storage, the container comprising sheet metal members welded together to form a main fillable volume; four hollow, sheet metal, vertically directed leg portions having cavities therein and situated at corner positions on the container; and, a separate lid member fixable to the container to seal at least the main fillable volume wherein a horizontally directed base-wall member of the main fillable volume is provided with a stiffening member on an internal face thereof.

Where containers according to the present invention are to be stacked with other similar containers and/or with stillages holding filled drums as described hereinabove with reference to the prior art, it is necessary that the horizontal base panel member of the container does not sag below a horizontal level and remains at least flat even when filled with waste and grout. In order for the containers according to the present invention and/or stillages according to the prior art when stacked together in stacks of up to nine high, for example, to remain stable, it is essential that the only contact with an adjacent container or stillage is through the ends of the leg members. Thus, sagging of the base panel member in a downwardly direction to contact the container or stillage below is unacceptable due to a dramatic reduction in stability of the stack and damage caused to adjacent items.

Whilst the containers are generally placed upon a flat surface after filling with waste and prior to filling with liquid grout which subsequently cures and solidifies thus becoming self-supporting, in some cases this may not be possible and it is therefore necessary for the container base to be inherently resistant to sagging even when full. Furthermore, the possibility that the containers will not be back-filled with grout and may nevertheless be filled to their maximum load capacity must be allowed for in the construction.

The form of the stiffening member may be of generally cruciform shape extending between opposite walls or between opposite corners of the container within the main fillable volume. The arms of the stiffening member may be of inverted channel shape and welded at least to the container base inner surface. The depth of the cruciform member may be minimised so as not to compromise too much the load capacity of the container with regard to the size of waste which may be contained therein.

Due to the need, in most cases, to preclude any volumes within the container from being unfilled with grout, suitable apertures are formed in the stiffening member to ensure that all spaces are filled by a rising level of liquid grout when grouting the waste filled main volume.

Because the stiffening member is not subject to long-term corrosion attack when the container is filled with grout as is the exterior of the container, it may be made of material other than stainless steel such as a ferritic stainless steel for example. The reason for this is that the grout tends to neutralise any acids formed and to prevent corrosive attack. If the container is not to be grouted, all components may need to be made of austenitic stainless steel.

According to a fourth aspect of the present invention, there is provided a sealable container for receiving toxic waste for long-term storage, the container comprising sheet metal members welded together to form a main fillable volume; four hollow, sheet metal, vertically directed leg portions having cavities therein and situated at corner positions on the container; and, a separate lid member fixable to the container to seal at least the main fillable volume, the container further including a grid to cover the main fillable volume to prevent waste contained therein from rising above the surface of liquid grout until said grout has solidified, the grid, in use, remaining below the surface level of solidified grout.

Some of the toxic waste which will be stored within the container will be of a lower density, perhaps due only to having hollow voids or due to the material per se being of a lower specific gravity than the liquid grout used for filling the container. In these circumstances, it is important to prevent the waste from floating in the grout while still liquid and from protruding above the surface and possibly interfering with lid closure. In the case of radioactive waste, regulations demand that it is completely immersed in grout during storage.

The grid may take the form of a metal mesh having a stiffening frame which fits through the open aperture at the mouth of the container and locks into position at a level within the container which, in use, is below the final level at which solid grout will exist thus, the waste and the grid will be submerged in the solid grout.

Preferably, the grid may be fastened in position in the container by means which are relatively easily operated remotely by manipulator means.

In order that the present invention may be more fully understood, examples will now be described by way of illustration only with reference to the accompanying drawings, of which:

Figure 2A:
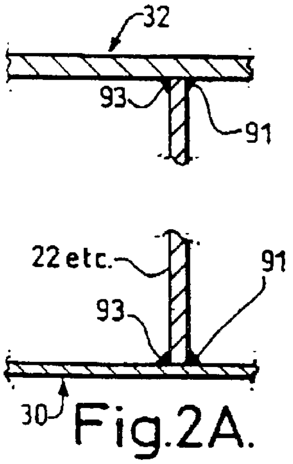
FIGS. 2A and 2B show details of possible fillet weld configurations for joining the vertical wall plates to the horizontal top and base plates of a container according to the present invention.
Figure 2B:
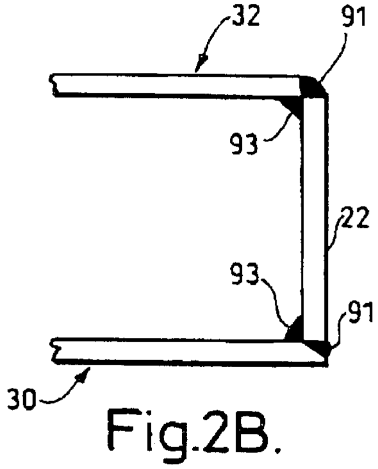
Figure 6:
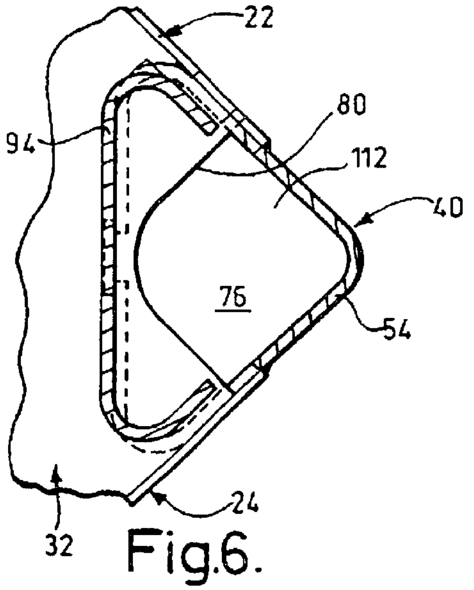
FIG. 6 shows a cross section through the top of a leg member along the line 6-6 shown in FIG. 4.
Figure 3:
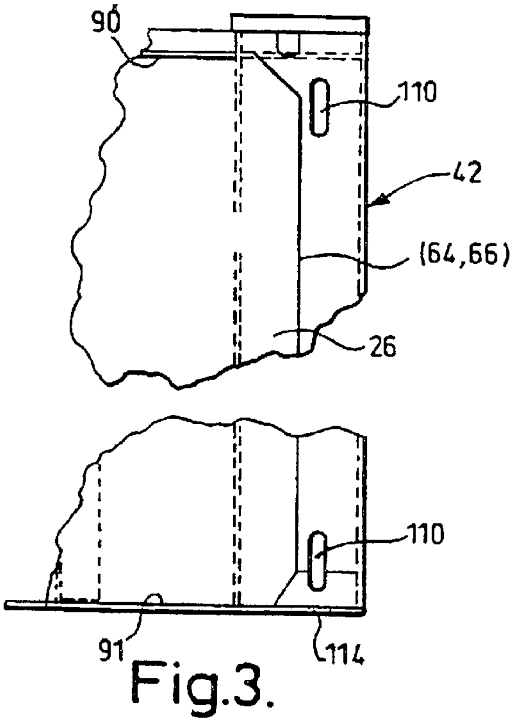
FIG. 3 shows a view in elevation of part of the container in the direction of the arrow "3" of FIG. 1.
Figure 7:
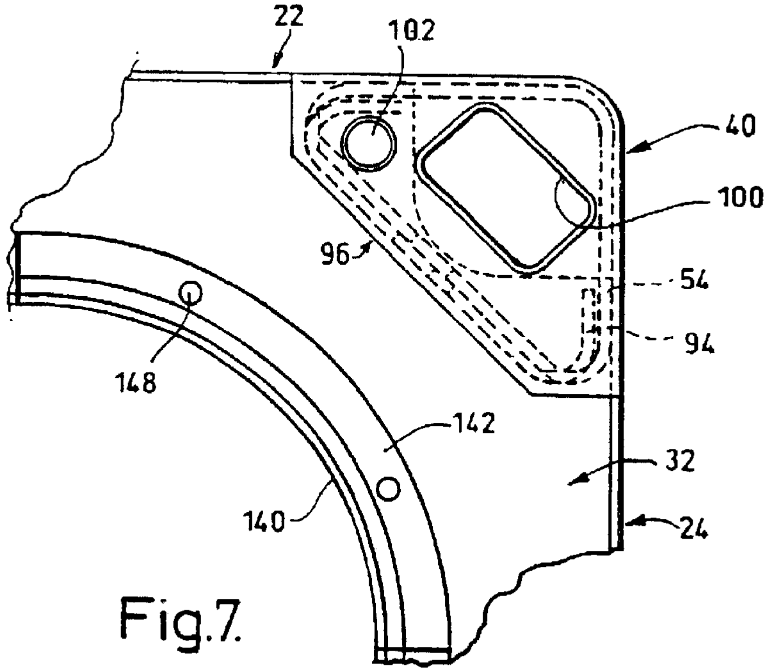
FIG. 7 shows the region indicated by the arrow "7" in FIG. 1 in greater detail.

Referring now to FIGS. 1 to 10 and where the same features are denoted by common reference numerals. A sealable container for the long-term storage of toxic waste, particularly so-called intermediate level radioactive waste, is indicated generally at 20. The container comprises four vertical outer wall panels 22, 24, 26, 28; a horizontal outer base panel 30; a horizontal upper panel 32 having an aperture 34 therein for the purpose of filling the container with waste (not shown); and a lid member 36 (see FIGS. 9 and 10) for sealing the aperture 34 after filling with waste. A leg member 40, 42, 44, 46 is provided at each corner of the container. A stiffening member 50 of generally cruciform shape is provided on the internal face of the base panel member 30. The leg members 40 etc. are formed by fabrication from a sheet of metal, in this case stainless steel, 54 (see FIG. 5) into a generally triangular shape in cross section leaving a gap 56 which is bridged by a keeper plate 58 seal seam welded by fillet welds 60, 62 along their entire length (the remaining legs 42, 44, 46 are constructed in identical fashion). The vertical side plates 22 to 28 are welded to the leg members 40 etc. by continuous fillet welds 64, 66 and intermittent stitch welds 68, 70 (the remaining legs have identical construction and will not be described individually). The base of the leg members 40 etc. abut the lower base plate 30 and are welded 74 around the periphery thereof so as to seal the internal volume 76 of each leg from the main fillable volume 78 of the container 20. The horizontal upper panel 32 has a cut-out 80 at each corner where it meets the leg members (see FIG. 6). Each leg member 40 etc. has a rebate 82 at its upper end so as to leave a short portion 84 extending vertically above the top plate 32 (see FIG. 4) . The rebated portion is seam welded 88 around the periphery thereof to the underside 90 of the top plate 32 again sealing the interior 78 of the container from the interior 76 of each leg. Welded 92 to the upper plate 32 at each cornea is a spacer member 94 formed into a shape corresponding generally to that of part of the leg cross section (see FIGS. 4 and 6). The top of the spacer member 94 when welded to the top plate 32 is level with the top of the extended portion 84 of the leg and enables a horizontal stacking and lifting plate member 96 of generally triangular shape to be welded 98 thereto. The stacking and lifting plate 96 has a hole 100 of elongate, non-circular shape therein to enable twist locks (not shown) of lifting apparatus (also not shown) to lift the container in the empty and full conditions. Also included in the plate 96 are round location holes 102 which co-operate with location dowels (not shown) of plant for the filling of the container 20 with intermediate level radioactive waste and grout with a minimum of leakage. The vertical extent of the portion 84, spacer 94 and plate 96 is sufficient to enable the base 30 of a second container stacked on top of the first container 20 to be clear of the lid member 36. The horizontal edges of the vertical side plates 22 etc. are continuous seam fillet welded to the edge of the top plate 32 and to the base plate 30 by fillet welds 91, 93 as shown in FIG. 2A which also applies to the top plate 32 to vertical side plate welds. FIG. 2A shows a schematic diagram of two fillet welds 91, 93 on the inner and outer surfaces of the junctions. In some cases a single weld may be sufficient but in cases where one of the plates is relatively thin and high stress results, two welds may generally be employed, one each on the inner and outer faces/edges. FIG. 2B shows an alternative form of fillet weld construction where the top plate 32 is welded to the side plate 22 etc. by two welds 91, 93 as are the sides 22 etc. to the bottom plate 30. Each leg member 40 etc. is provided with apertures 110, 112, 114 at the sides, top and bottom thereof respectively to enable a rising level of liquid grout, when poured into a repository containing a plurality of the containers 20, to fill the leg interior volumes 76 without leaving air spaces behind. The aperture 114 at the bottom of each leg corresponds to the aperture 100 at the top of each leg when two or more containers are stacked together. Thus, the main interior fillable volume 78 is separate from the interior volumes 76 of the legs which may be back-filled with grout during long-term storage as required. The vertical side wall plates 22 etc. are provided with stiffening ribs 120 to prevent bowing of the sides when filled with waste. The base 30 is provided on the inner face thereof with a stiffening member 50 of generally cruciform shape. The stiffening member 50 is formed of sheet metal pressings and has four arms 124 which are each of inverted channel section and stretch from corner to corner of the container. The lower edge 126 of the stiffening member is welded 128 to the inner surface of the base plate 30 leaving apertures 130 at intervals along the edge. The upper surface of the member 50 has apertures 132. The combined effect of the apertures 130 and 132 is to enable a rising level of liquid grout within the volume 78 of the container 20 to completely fill the space 134 between the stiffening member 50 and the base plate 30. The aperture 34 of the top plate 32 has a formed upturned lip 140, the lip 140 being surrounded by a reinforcing ring 142 welded 144, 146 thereto (see FIG. 4). The ring 142 is provided with threaded bolt holes 148 to receive bolts 150 for securing the co-operating lid 36 member (see FIG. 9) to the ring 142 in order to seal the container 20 after filling with waste and grout. The lid member 36 is a sheet metal pressing shaped to co-operate with the ring 142 by having a downturned flange 160 (see FIG. 10) which fits around the outer surface 162 of the ring 142. The inner volume of the lid 36 is filled with mineral wool 166 to decrease the residual volume thereof in order to prevent or minimise build-up of hydrogen, and a seal ring 168 is fixed to the inner surface to seal against the upper surface 170 of the ring member 142. The lid 36 may also have a filter (not shown) in the centre thereof to control the release of hydrogen from the interior contents of the container. Such filters are common and are used on other types of containers intended for the long-term storage of radioactive waste.

The base member 30 may be formed with a concave shape, i.e. inwardly dished, when viewed from the side in order to further ensure against the base panel sagging when filled with waste or waste and grout.

Thus, it may be seen from the foregoing description that the container of the present invention provides a main fillable volume 78 which is separate, sealed and distinct from the volume 76 of each of the leg members 40 etc. In use the containers of the present invention and the stillages of the prior art are placed close together in storage vaults and in repositories with perhaps only about a 125 to 130 mm gap separating the vertical wall faces of adjacent containers. Thus, where four containers are stacked in square array, there is no radioactive waste approaching at the junction of any four containers so obviating any problem of criticality.

Figure 1:
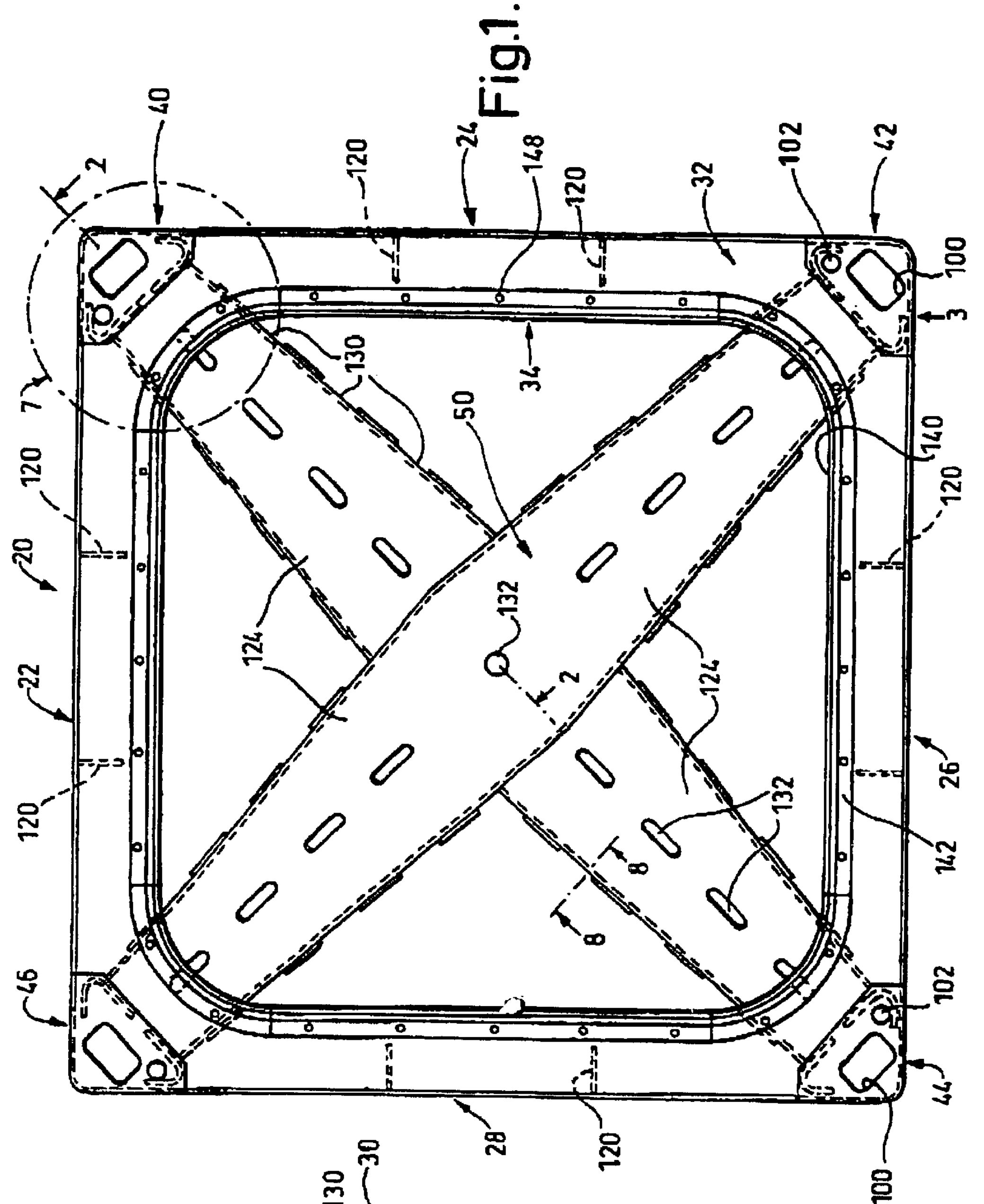
FIG. 1 shows a plan view of a first embodiment of a sealable container according to the present invention.
Figure 8:
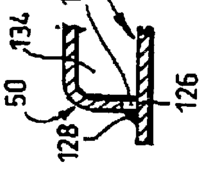
FIG. 8 shows a cross section along the line 8-8 shown in FIG. 1 of part of a base stiffening member.
Figure 2:
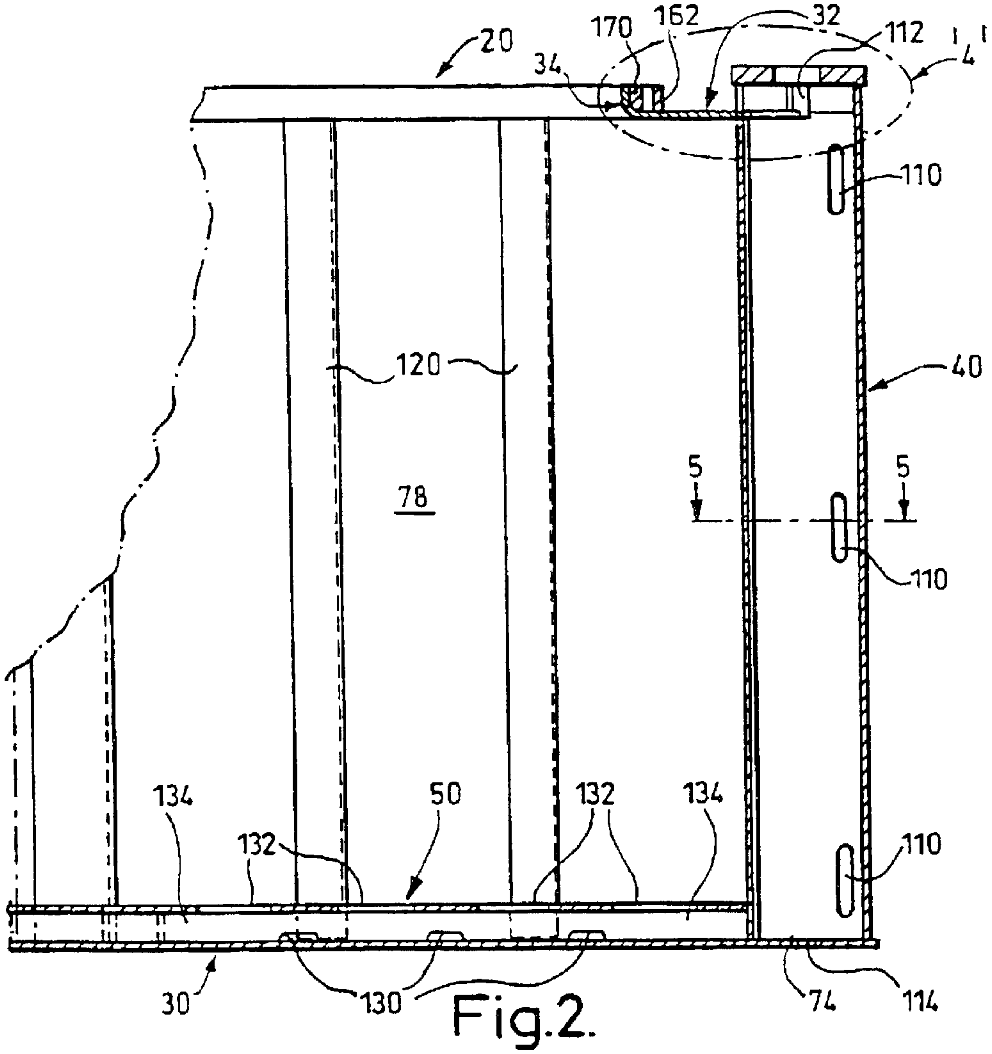
FIG. 2 shows a section in elevation on the line 2-2 of FIG. 1.
Figure 4:
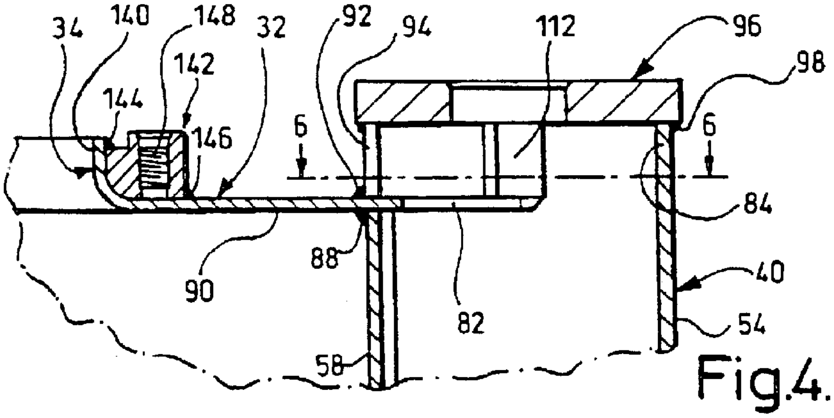
FIG. 4 shows the top portion of a leg in greater detail indicated by the arrow "4" of FIG. 2.
Figure 5:
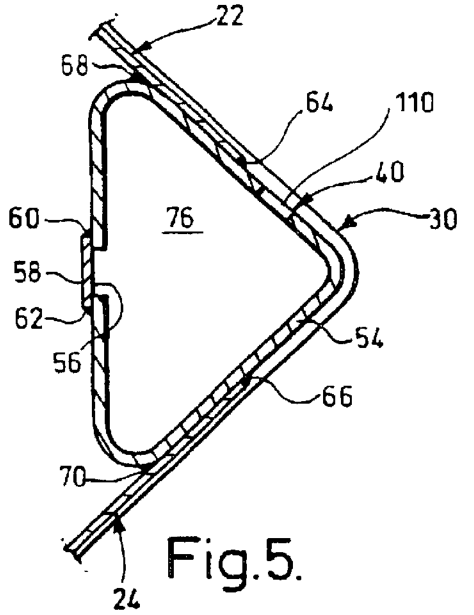
FIG. 5 shows a cross section through a leg member along the line 5-5 shown in FIG. 2.
Figure 10:
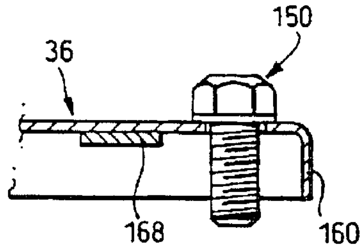
FIG. 10 shows the portion indicated by the arrow "10" of FIG. 9 in greater detail.
Figure 9:
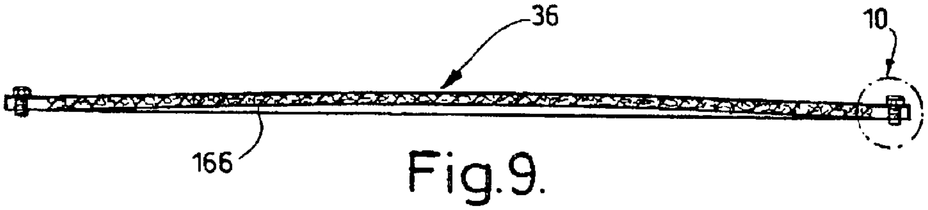
FIG. 9 shows a cross section of a lid member for the container of FIGS. 1 to 8.

In some embodiments of the present invention where it is desired to fill the leg volume along with the main interior volume due to the waste being of low activity and the risk of criticality arising is correspondingly low for example, the construction as shown in FIGS. 1 to 10 may be modified. For example, instead of a continuous keeper plate 58 as shown in FIG. 5, a series of short keeper plates leaving spaces therebetween may be employed. Where this is the case, the top of the legs may be modified such that the rebate 112 and cut-out 80 are omitted, the top plate 32 extending over the entire area of the container. Similarly, the apertures 110, 112 and 114 will be omitted to enable the volume 78 to be sealed.

In some instances it may be required to separate the volumes of the main container and the legs. However, it may also be required to fill the legs with grout prior to transferring the filled container to a repository. In this case, whilst the overall construction may be as described with reference to FIGS. 1 to 10, the lower apertures 114 and the apertures 110 in the vertical faces of the legs 40 etc. may be omitted to enable the legs to retain liquid grout until cured (solidified).

The above embodiment has been described with reference to a container fabricated from four leg members and essentially flat sheets of metal forming the sides, base and top panels. However, other constructions are possible within the scope of the invention as will be shown below with reference to the legs and main volume.

FIGS. 11A to 11H show schematic horizontal cross sections of alternative leg constructions within the scope of the present invention.

Figure 11A:
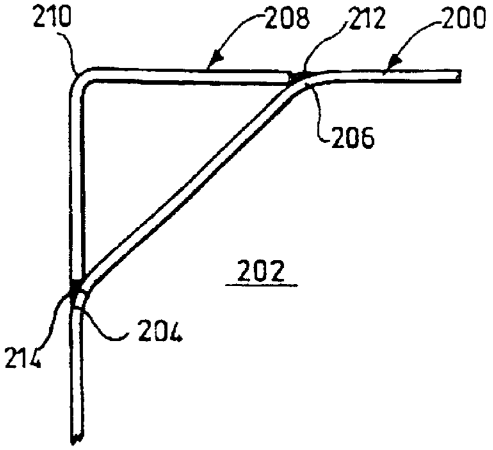
FIGS. 11A to 11H show alternative schematic cross sectional views of different leg constructions.

FIG. 11A shows a construction where the vertical side plate 200 of the main volume 202 is a formed sheet having two bends 204, 206 and extending through and around the corner region of the container to constitute at least two vertical walls of the container. The leg 208 is formed by a sheet metal member formed with a right angle bend 210 and fillet seam welded 212, 214 along the edges thereof. The remaining structure may be substantially as described with reference to FIGS. 1 to 10 above.

Figure 11B:
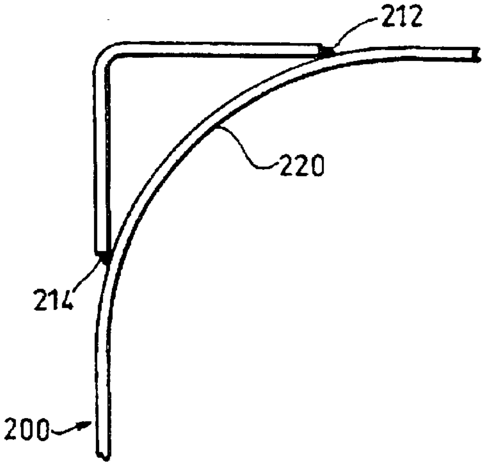

FIG. 11B shows a construction similar to FIG. 11A but where the container side plate 200 takes the form of a continuous curve 220 at the corner region. The other features of this embodiment are the same as FIG. 11A.

Figure 11C:
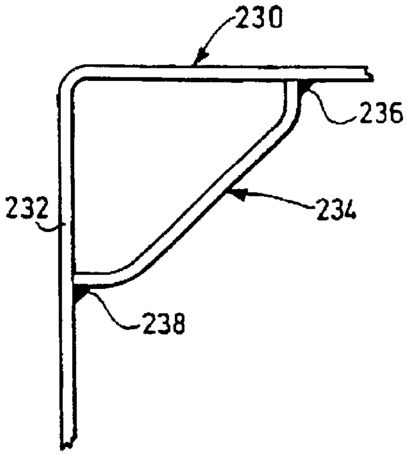

FIG. 11C shows an embodiment wherein the container side plate 230 effectively forms a continuous outer wall 232, the leg being formed by an internal sheet member 234 welded 236, 238 to the inner surface of the container side plate.

Figure 11D:
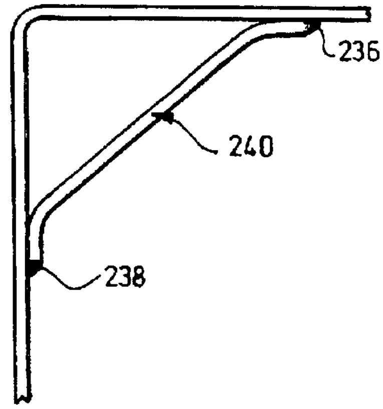

FIG. 11D is similar to FIG. 11C but the internal sheet leg forming member 240 is reversed.

Figure 11E:
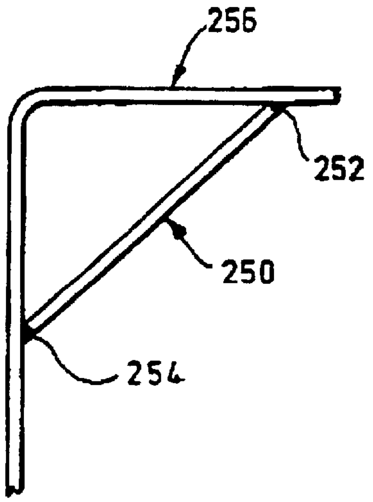

FIG. 11E is a simplified version of the construction shown in FIGS. 11C and 11D where a flat plate 250 is welded 252, 254 to the inner faces of the container side wall plate 256.

Figure 11F:
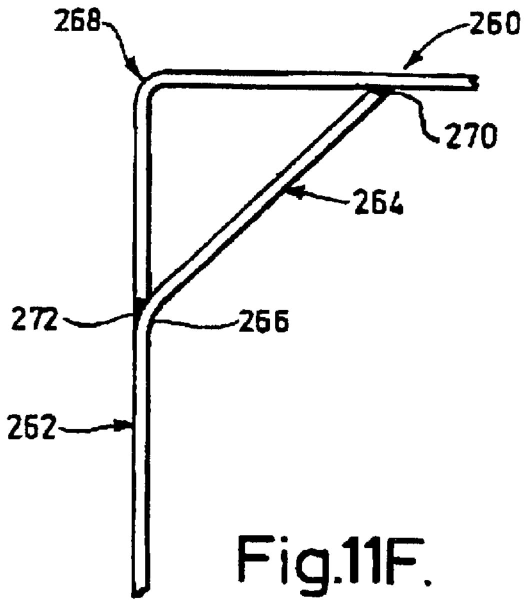

FIG. 11F shows a construction where two adjacent side wall plates 260, 262 are welded together to form an integral leg member 264. The first plate 262 is formed with an obtuse angle bend 266 and the second plate 264 is formed with a right angle bend 268. The two plates are welded 270, 272 to form the leg member 264 at the junction of the two plates. All four leg members may be formed in this way, i.e. the remote end of plate 260 will have the obtuse bend of plate 262 and the remote end of plate 262 will have the right angle bend of plate 260 and so on.

Figure 11G:
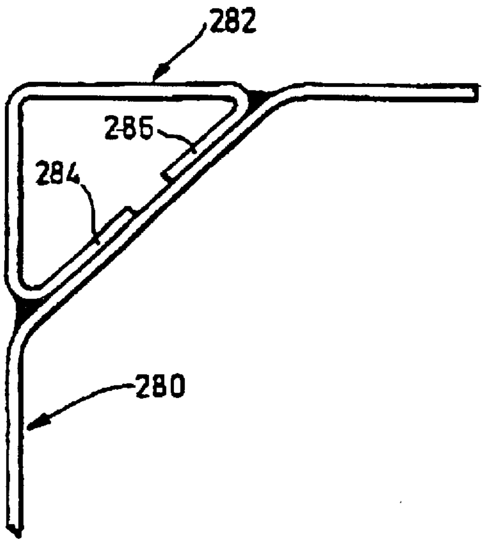

FIG. 11G shows a construction where the vertical wall side plate member 280 has a similar form to the wall side plate of FIG. 11A but the leg member 282 is formed from a sheet which is bent into generally triangular form to provide added rigidity and strength in the vertical direction due to the portions 284, 286 of the leg member 282.

Figure 11H:
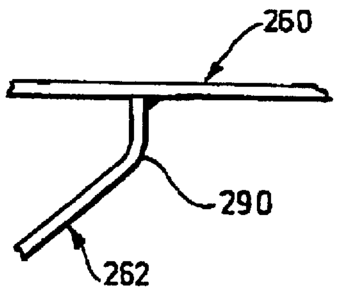

FIG. 11H shows a construction in part similar to that of FIG. 11F where the wall side plate 262 is provided with an additional bend 290 so as to meet the wall plate 260 at a right angle for additional strength in the vertical direction.

All of the embodiments of FIGS. 11A to 11H may be provided with apertures in the leg members and/or in the main container wall plate common to the leg volume so as to render the volumes of the container and the legs either separate from one another or as a continuous volume as desired and as described with reference to FIGS. 1 to 10.

FIGS. 12A to 12I show schematically various alternative constructions for joining a standard leg member as shown in FIGS. 1 to 10 with vertical side plate wall members. In the embodiments shown with respect to FIGS. 12A to 12H the leg member 300 is the same. The leg member comprises a single sheet of metal 302 bent into a substantially triangular shape and having a gap 304 between adjacent edges 306, 308.

Figure 12A:
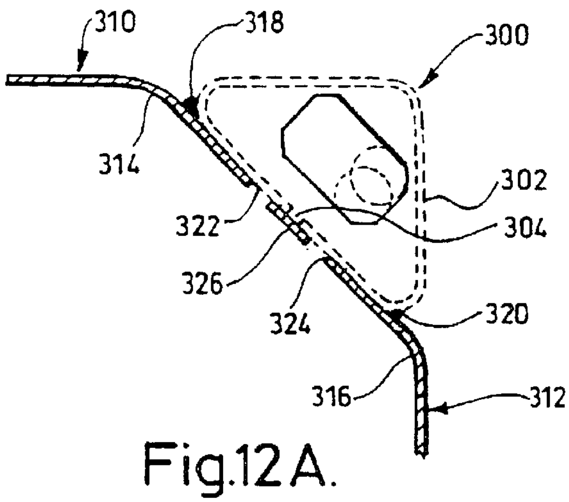
FIGS. 12A to 12I show alternative schematic constructions for joining the plates of the main volume to a "standard" leg member.

FIG. 12A shows a construction where the side wall plates 310, 312 are bent with obtuse angles 314, 316, seam welded 318, 320 on the outside and stitch, i.e. intermittently welded 322, 324 on the inside. A separate keeper plate 326 seam welded over the gap 304 is employed to seal the leg volume.

Figure 12B:
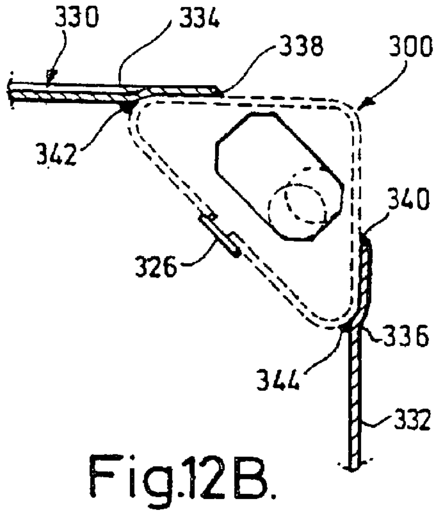

FIG. 12B shows a construction similar to that shown in FIGS. 1 to 10 but where the side plates 330, 332 have inflections 334, 336 and are welded to the outside of the leg member 300 with seal seam welds at 338, 340 and stitch welds at 342, 344, A separate keeper plate 326 is again used.

Figure 12C:
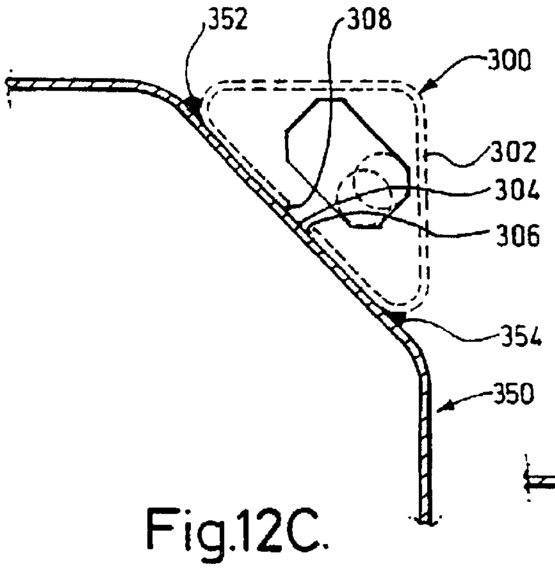

FIG. 12C shows a construction wherein a continuous vertical wall plate 350 is used which itself bridges the gap 304 thus obviating a separate keeper plate over the gap 304. Seal seam welds 352, 354 are provided.

Figure 12D:
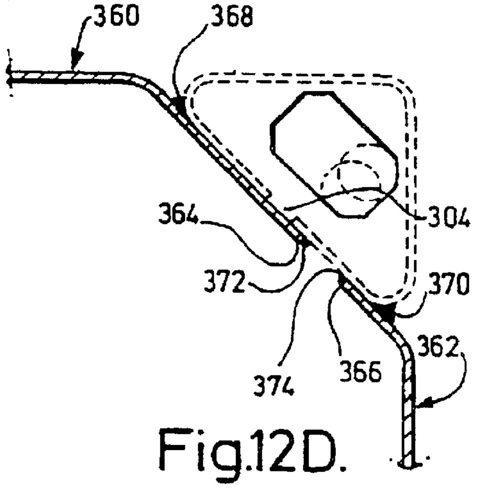

FIG. 12D shows a construction which is similar to FIG. 12C but where two side wall plate members 360, 362 are employed but having edges 364, 366 offset from the gap 304 so as to obviate the need for a separate keeper plate. Seal seam welds are provided at 368, 370 and 372, 374.

Figure 12I:
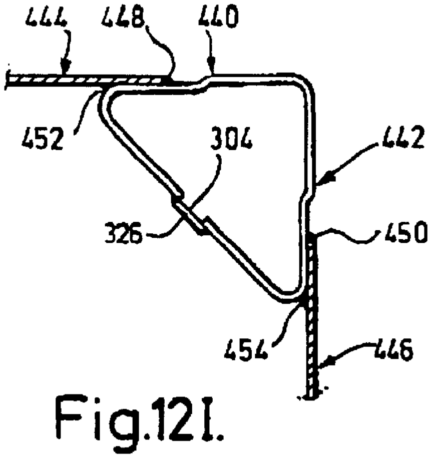
Figure 12F:
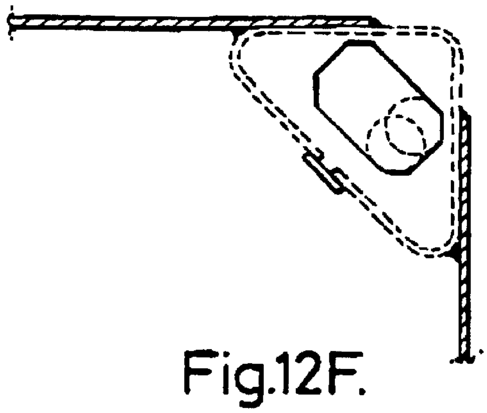
Figure 12E:
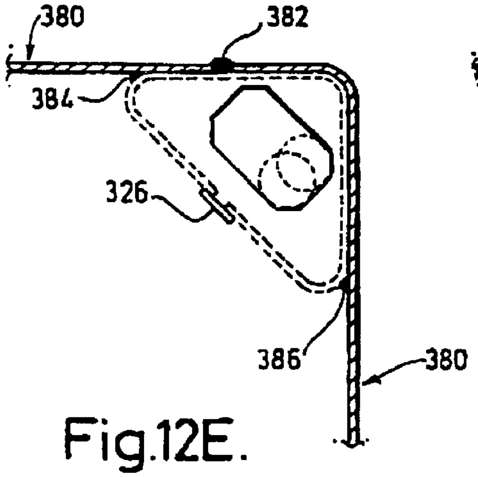

FIG. 12E shows a construction having a single continuous outer wall plate 380 which surrounds all four leg members 300 and has a single side wall closure weld at 382. Seal seam welds are provided at 384, 386 to attach the leg member 300 to the wall plate 380. A separate keeper plate 326 over the gap 304 is again employed.

The embodiment of FIG. 12E utilising either two wall plates or four wall plates may alternatively be employed. FIG. 12F shows a construction essentially similar to that described with reference to FIGS. 1 to 10 utilising flat wall plates.

Figure 12G:
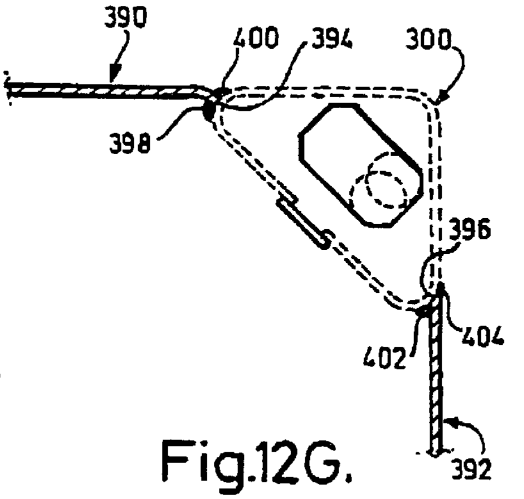

FIG. 12G shows a construction where the end portions of plates 390, 392 are formed so that edges 394, 396 meet the corners of the leg member 300 substantially at right angles so allowing two continuous seal seam welds 398, 400 and 402, 404 to be formed on each face of the plates 390, 392. A separate keeper plate 326 is again employed to cover the gap 304.

Figure 12H:
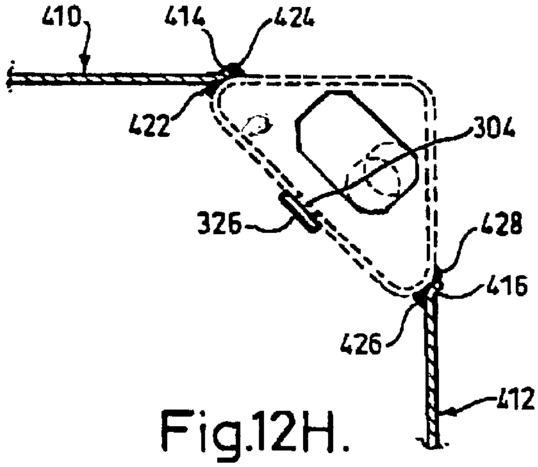

FIG. 12H shows a construction where the end edges of the wall plates 410, 412 are formed with shallow lips 414, 416 to allow continuous seal seam welds 422, 424 and 426, 428 to be formed. A separate keeper plate 326 is provided to cover the gap 304.

FIG. 12I shows a construction wherein the leg member 300 is slightly different in that offset walls 440, 442 are provided. The offset walls allow the side wall plates 444, 446 to be fixed substantially flush with the outer surface of the leg. Continuous seal seam welds 448, 450 are provided on the outside and stitch welds 452, 454 on the inside. A separate keeper plate 326 is used to cover the gap 304.

Figure 13:
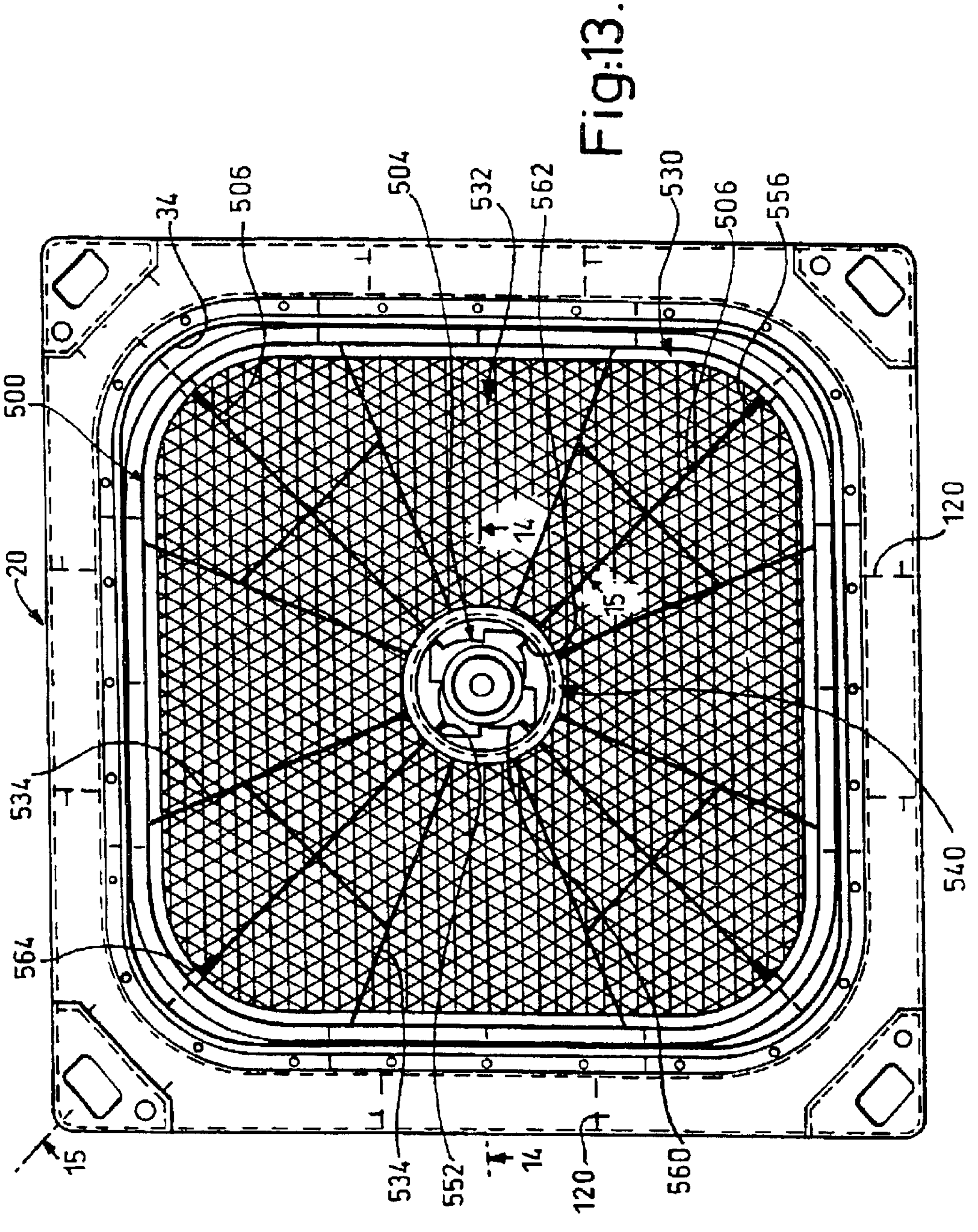
FIG. 13 shows a plan view of a container according to the fourth aspect of the invention having an anti-flotation grid therein.
Figure 14:
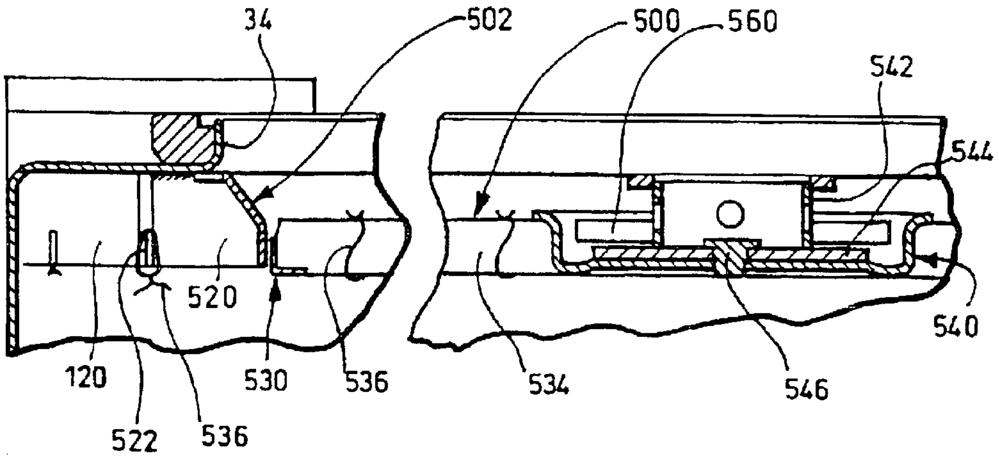
FIG. 14 shows a partial cross section in elevation of the mouth of the container and the grid on the line 14-14 of FIG. 13.
Figure 15:
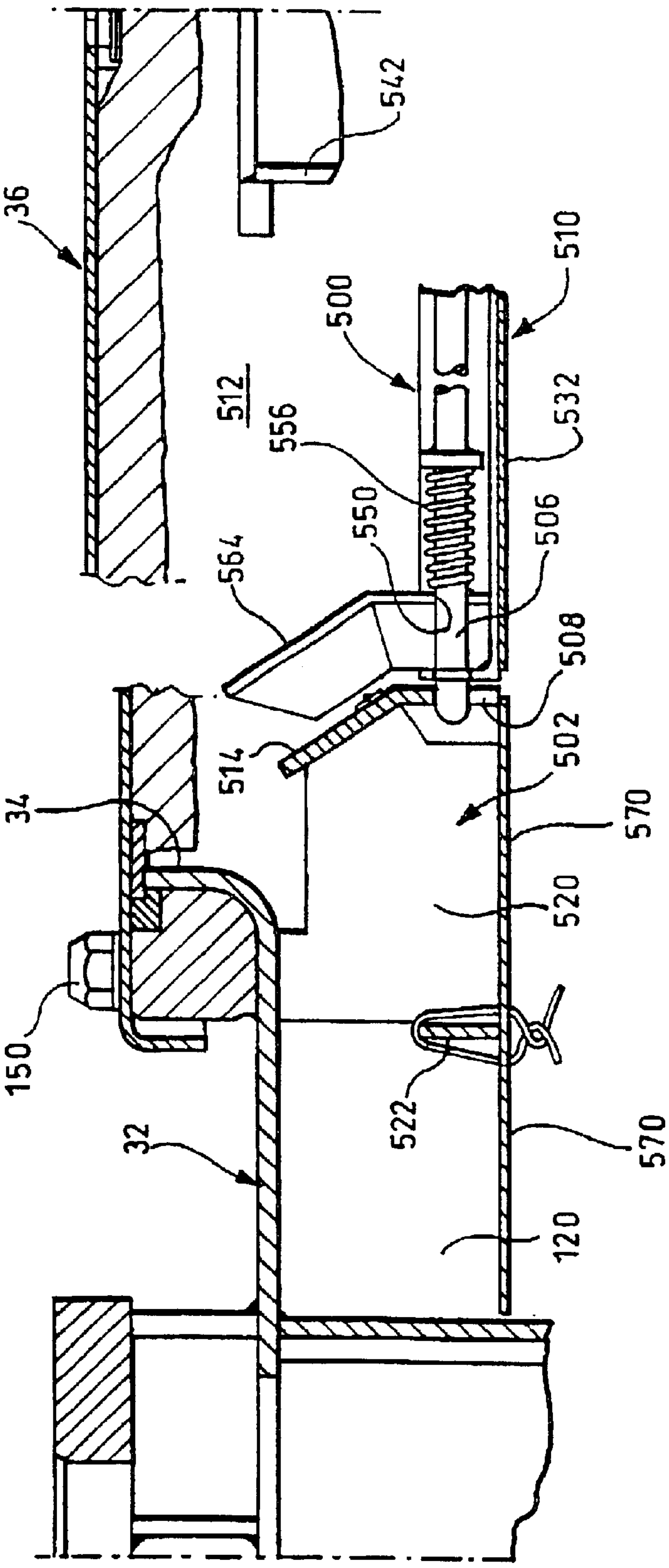
FIG. 15 shows a similar partial cross section to that shown in FIG. 14 but on the line 15-15 of FIG. 13 and also including a lid in position.
Figure 16:
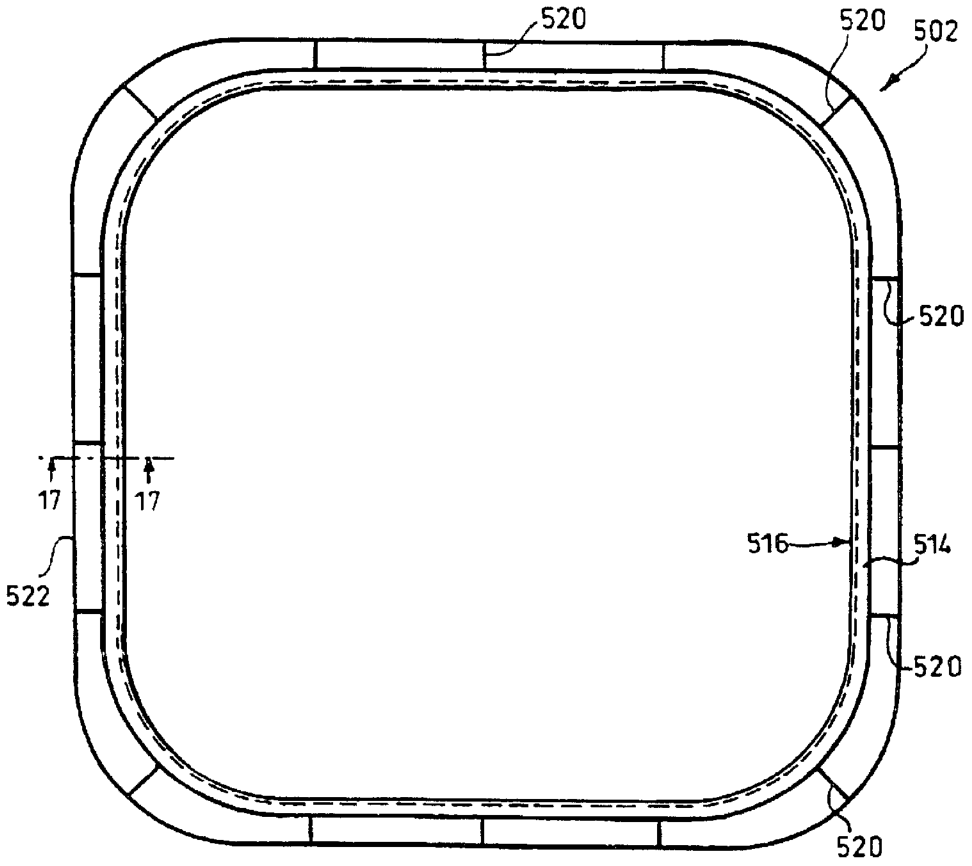
FIG. 16 shows a plan view of a sub-assembly for fixing within the container for locating and supporting an anti-flotation grid.
Figure 17:
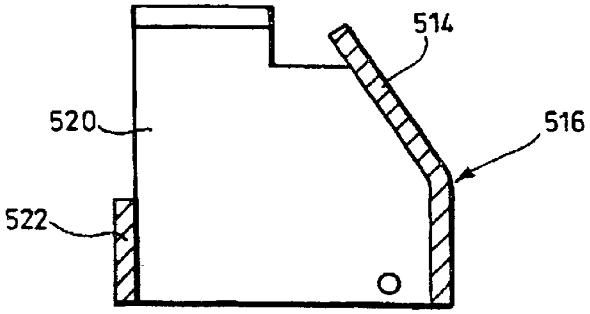
FIG. 17 which shows a detail on the line 17-17 of FIG. 16 of how the sub-assembly of FIG. 16 is fixed within the container.

FIG. 13 shows a plan view of a container 20 according to one or more aspects of the present invention described with reference to FIGS. 1 to 10 and further including an anti-flotation grid 500. The grid 500 is of such size and shape that it can enter the container mouth aperture 34 whilst held in a horizontal attitude. The grid co-operates with a support structure 502 fixed within the container below the level of the upper panel 32 and is fixed in position by means of cam actuated shooting bolts 506 which engage with receiving holes 508 on the support structure 502. Thus, when the container volume 78 is filled with waste (not shown) and the remaining free space filled with liquid grout, the waste cannot float and rise above the lower level 510 of the grid when in position in the container. The space 512 above the grid is finally filled with clean grout (not shown) so as to form a clean cap in the container below the lid 36. The support structure 502 comprises a neck member 516 of outer shape generally corresponding to the aperture 34 of the container, the neck member having a bell-mouthed portion 514. The bell-mouthed portion 514 is to assist in guiding the grid structure 500 into position and also provide guidance and location for container filling apparatus (not shown) . The neck member 516 is fixed below the container aperture 34 by gusset plates 520 which are welded to the underside of the top panel 32 and to the neck member 516. The gusset plates 520 are provided at regular positions around the inner periphery of the container and are linked on their lower outer edge by a rail 522 which is welded thereto and runs around all of the gusset plates 520 to connect them together for stiffening purposes. The neck member 514 is provided with the receiving hole 508 at each corner position to engage with shooting bolts 506 movably retained on the grid 500 to be described below. The anti-flotation grid 500 comprises an outer rim 530 of right angle section to which is attached on the underside thereof a mesh 532 to prevent waste floating in the grout (not shown) from rising. The rim 530 is provided with generally radially directed stiffening bars 534 which also provide suitable means for the attachment of the mesh 532 such as for example by wires 536. In the centre of the grid 500 is a dish-shaped member 540 with a tubular member 542 having a lower flange 544 in the centre thereof, the tubular member 542 and flange 544 being rotatably mounted by a bearing 546 in the dish shaped member 540. Holes 550 in the grid rim 530 and holes 552 in the dish-shaped member 540 provide guidance for the shooting bolts 506 which are resiliently biased by springs 556 to a retracted position. The tubular member 542 has cam portions 560 fixed to the outside thereof such that clockwise rotation thereof pushes the shooting bolts 506 outwardly so as to engage the receiving holes 508 and lock the grid 500 in position in the neck member 516. The cam portions 560 are also provided with rotation stops 562 to limit the maximum extent of rotation of the tubular member 542. The outer rim 530 is provided with angled leg pieces 564 which co-operate with the bell-mouthed portion 514 of the neck member 516 so as to enable the grid to rest on and be supported on the support structure 502 prior to the shooting bolts 506 being engaged. Mesh 570 is fixed to the rail 522 and to the underside edge of the gusset plates 520 and to the bottom edge of the stiffening ribs 120 which are welded to the container walls 22, 24, 26, 28 so that any floating waste cannot rise above the lower level of the rail 522.

In use, the container 20 is filled with waste (not shown) and the grid 500 placed and locked in position. Liquid grout is poured through the mesh 532 up to the level thereof. Once this has at least partially solidified, further grout is poured so as to fill the void 512 above the mesh 532 and 570, the lid 36 being finally secured in place as described with reference to previous embodiments.

The container as described with reference to the above embodiments is made with an outer surface as smooth as possible and, in particular, with no traps which would prevent the run-off of water for example. This assists in spray decontamination of the outer surfaces and also provides a surface which is suitable for swabbing tests to check for contamination.

In all of the above embodiments, it may be assumed that unless otherwise specified, the welds are fillet welds. The terms "seam weld", "seal weld", "seal seam weld", "continuous seam weld" etc. being for practical purposes synonymous with the term "fillet weld".

In the embodiments described above, the various features may be interchanged between embodiments as required.

In all embodiments, the container is suitable for long-term storage of so-called intermediate level radioactive waste. The waste is permanently held in the container by solidified grout which on filling the container is essentially a very fluid water and cement mixture which cures by chemical means and the bulk of the water is allowed to evaporate away prior to fixing of the lid in position. Due to the nature of the waste intended to be held in the container, the container, the filling thereof with waste and grout, the placement and locking in position of the anti-flotation grid and the fitting and sealing of the lid in position are effected remotely by handling and manipulation equipment so as to prevent human contact therewith.

What is claimed is:

1. A sealable container (20) for receiving toxic waste for long-term storage, the container being characterised by comprising sheet metal members (22, 24, 26, 28, 30, 32) welded together to form a main fillable volume (78); four hollow, sheet metal, vertically directed leg portions (40, 42, 44, 46) situated at corner portions on the container; and, a separate lid member (36) fixable to the container to seal at least the main fillable volume (78) wherein the majority of the weld length utilised in the container construction is constituted by fillet welds.

2. A container according to claim 1 wherein the leg members (40, 42, 44, 46) have a generally triangular cross sectional shape.

3. A sealable container according to claim to claim 2 characterised in tat the cavities of the of the four hollow leg portions are sealed (58) from the main volume of the container but are fillable (110) from the exterior of the container.

4. A container according to claim 3 wherein the leg cavities are fillable (11) by a rising level of liquid grout.

5. A container according to claim 3 wherein the leg portion is a separate (40, 42, 44, 46; 300) member attached to the main container volume.

6. A container according to claim 3 wherein at least one vertical wall (200, 230, 256, 260, 220) of the triangular leg portion is constituted by a vertical wall (200, 220, 230,256, 260) of the main container.

7. A sealable container according to claim 1 characterised by a horizontally directed base-wall member (30) o the main fillable volume (78) being provided with a stiffening member (50) on an internal face thereof.

8. A container according to claim 7 wherein the stiffening member (50) is of cruciform shape.

9. A container according to claim 8 wherein the stiffening member extends between opposite corners of the container.

10. A container according to claim 8 wherein the arms of the stiffening member are of inverted channel shape and welded (128) at least to the container inner base wall surface.

11. A container according to claim 8 wherein the stiffening member (50) is provided with apertures (130, 132) to permit ingress of a grout and escape of air when the container is being filled by a rising level of liquid grout.

12. A sealable container according to claim 1 the container being characterised by further including a grid (500) to cover the main fillable volume (78) to prevent waste contained therein from rising above the surface of liquid grout until said grout has solidified; the grid, in use, remaining below a surface level of said solidified grout.

13. A sealable container according to claim 12 wherein the grid (500) is in the form of a metal mesh (532) having a stiffening frame (530) which fits through an open aperture (34) at the mouth of the container and locks into position at a level within the container which, in use, is below the final level at which solid grout exist.

14. A sealable container according to claim 13 wherein the grid is fastened in position in the container by means (506, 560) which are operated remotely by manipulator means.

15. A sealable container according to claim 14 wherein said means comprises cam (560) operated shooting bolts (506) which engage with co-operating holes (508) In the container.

16. A sealable container according to claim 15 wherein said cam (560) is rotated about a substantially vertical axis.

17. A sealable container according to claim 1 wherein said toxic waste is radioactive.

* * * * *

UNITED STATES PATENT AND TRADEMARK OFFICE

CERTIFICATE OF CORRECTION

PATENT NO. : 6,809,329 B1

DATED : October 26, 2004

INVENTOR(S) : Raymond Victor Evans et al.

It is certified that error appears in the above-identified patent and that said Letters Patent is hereby corrected as shown below:

Column 10,

Line 40, after "according" delete "to claim", (2nd occurance)

Line 41, change "characterised" to -- characterized --

Line 41, after "characterized in" delete "tat" and insert therein -- that --.

Line 41, after "cavities" delete "of the", (2nd occurance)

Line 55, after "member (30)" delete "o" and insert therein -- of --.

Signed and Sealed this

Twelfth Day of July, 2005

JON W. DUDAS

*Director of the United States Patent and Trademark Office*